United States Patent
Huynh et al.

(10) Patent No.: US 10,017,242 B2
(45) Date of Patent: Jul. 10, 2018

(54) AIRCRAFT RUDDER PEDAL LOCKOUT ASSEMBLIES SYSTEMS AND METHODS

(71) Applicant: The Boeing Company, Chicago, IL (US)

(72) Inventors: Tommy P. Huynh, Kent, WA (US); Gary W. Schmidt, Federal Way, WA (US); Lance S. Schmucker, Kent, WA (US); Amber L. Beasley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 202 days.

(21) Appl. No.: 15/011,288

(22) Filed: Jan. 29, 2016

(65) Prior Publication Data
US 2017/0217567 A1    Aug. 3, 2017

(51) Int. Cl.
*B64C 13/14*    (2006.01)

(52) U.S. Cl.
CPC .................................. *B64C 13/14* (2013.01)

(58) Field of Classification Search
CPC .................................................... B64C 13/14
USPC ......... 70/32–34, 14, 58, 163, 164, 199–203, 70/226, 227, 237, 238
See application file for complete search history.

(56) References Cited

U.S. PATENT DOCUMENTS

| | | | |
|---|---|---|---|
| 1,215,837 A * | 2/1917 | Needham | B60R 25/005 70/14 |
| 2,035,231 A | 3/1936 | Haberstro, Jr. | |
| 2,144,135 A | 1/1939 | Zindel | |
| 2,371,673 A | 3/1945 | Bondar | |
| 2,406,233 A | 8/1946 | Linnert | |
| 3,169,731 A | 2/1965 | Phillips et al. | |
| 3,288,401 A | 11/1966 | Fete | |
| 3,898,823 A * | 8/1975 | Ludeman | B64C 13/14 244/224 |
| 3,971,532 A | 7/1976 | Fountain | |
| 4,076,095 A * | 2/1978 | Adamski | B60R 25/005 180/287 |
| 4,878,366 A * | 11/1989 | Cox | B60R 25/093 70/14 |
| 5,082,213 A * | 1/1992 | Torres | B64C 13/04 244/224 |
| 5,094,092 A * | 3/1992 | Hsieh | B60R 25/005 70/199 |
| 5,129,603 A | 7/1992 | Wippler | |
| 5,689,982 A * | 11/1997 | Chang | B60R 25/066 70/201 |
| 5,713,539 A * | 2/1998 | Russ | B60R 25/0221 244/224 |

(Continued)

*Primary Examiner* — Richard R Green
*Assistant Examiner* — Michael B Kreiner
(74) *Attorney, Agent, or Firm* — Haynes and Boone, LLP

(57) ABSTRACT

A lockout assembly for first and second rudder pedals of an aircraft includes first and second spacers, each of which is configured to be inserted within a corresponding one of first and second slots disposed in an adjacent rudder pedal housing. A coupling mechanism is configured to couple the first spacer to the second spacer through the rudder pedal housing so as to retain the first and second spacers in corresponding ones of the slots. The lockout mechanism prevents movement of the rudder pedals in a same direction, and hence, movement of the aircraft's rudder.

16 Claims, 6 Drawing Sheets

(56) References Cited

U.S. PATENT DOCUMENTS

| | | | | |
|---|---|---|---|---|
| 5,890,383 | A | * | 4/1999 | Chang .................. B60R 25/066 |
| | | | | 70/202 |
| 5,911,391 | A | * | 6/1999 | Russ .................. B60R 25/0221 |
| | | | | 244/224 |
| 5,950,464 | A | * | 9/1999 | Tonne .................. B60R 25/066 |
| | | | | 70/202 |
| 6,000,256 | A | * | 12/1999 | Pornaghdi ............. B60R 25/066 |
| | | | | 70/202 |
| 6,116,065 | A | | 9/2000 | Hale |
| 6,250,589 | B1 | * | 6/2001 | Russ ...................... B64C 13/14 |
| | | | | 244/1 R |
| 6,840,479 | B1 | | 1/2005 | Przygoda et al. |
| 6,966,865 | B2 | | 11/2005 | Drago et al. |
| 9,581,226 | B2 | * | 2/2017 | Petrou .................... F16H 25/12 |
| 2004/0089036 | A1 | * | 5/2004 | Gebow .................. B60R 25/09 |
| | | | | 70/226 |
| 2006/0218983 | A1 | * | 10/2006 | Horne .................. B60R 25/005 |
| | | | | 70/203 |
| 2007/0265134 | A1 | | 11/2007 | Robuck |
| 2017/0166298 | A1 | * | 6/2017 | Huynh .................... B64C 13/14 |

* cited by examiner

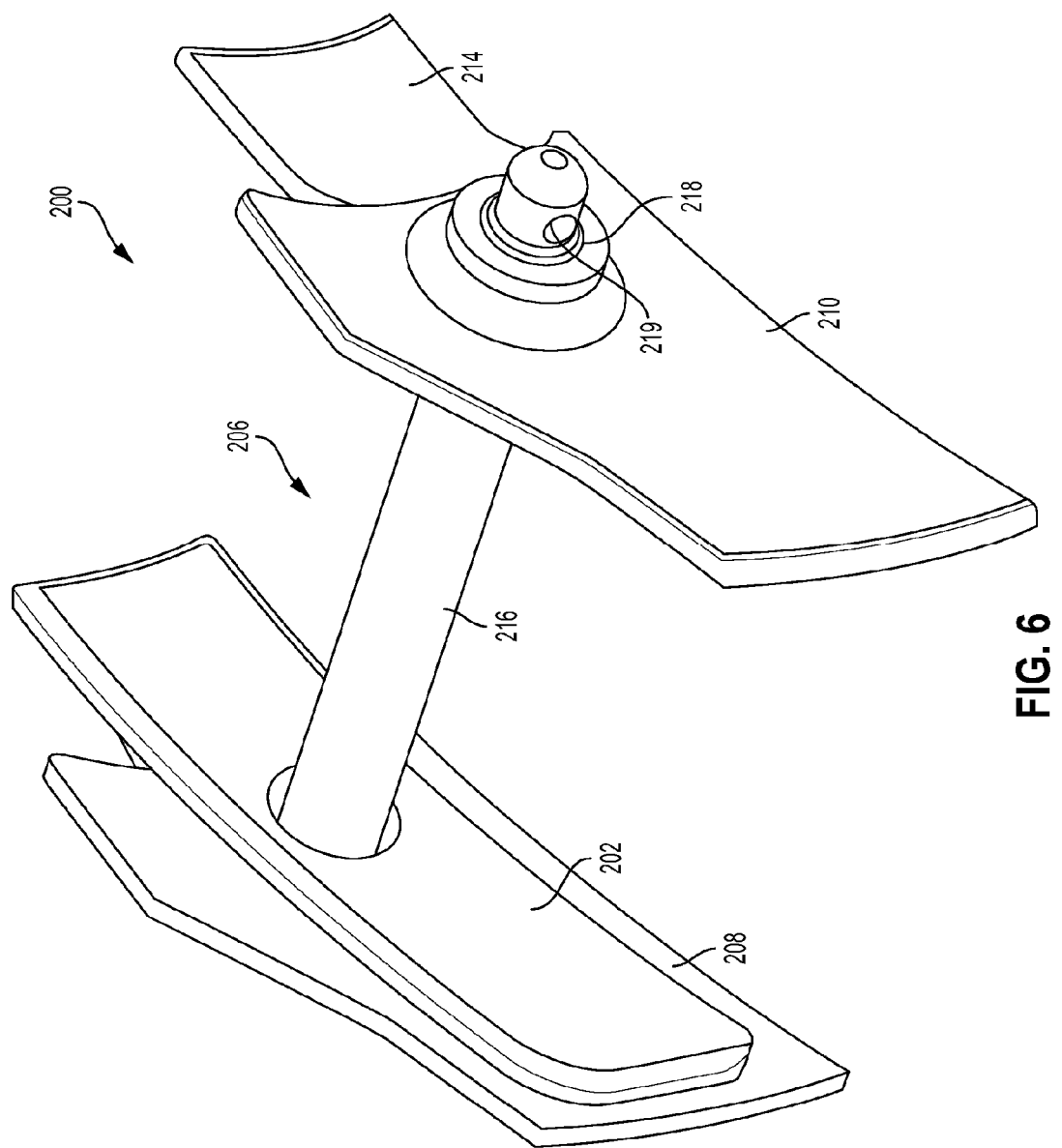

AIRCRAFT RUDDER PEDAL LOCKOUT ASSEMBLIES SYSTEMS AND METHODS

BACKGROUND

This disclosure relates to aircraft maintenance and servicing tools in general, and in particular, to lockout assemblies for aircraft rudder pedals.

A "Lockout-tagout" or "LOTO" mechanism is primarily a safety tool used in industrial and research settings to ensure that machines or mechanisms are properly shut off and/or immobilized and cannot start up or move prior to the completion of maintenance or servicing activities. The term "tagout" refers to the attachment of a tag or other written or printed medium to the lockout device that can indicate, for example, when, why, and by what authority the lockout device was placed in effect and/or is safe to remove. In the case of aircraft, and in particular, large commercial or military aircraft, it is sometimes desirable to prevent movement of the control surfaces, e.g., ailerons, flaps, elevators and/or rudders, while maintenance or repair work is being performed on them or on systems associated with or adjacent to the ailerons, flaps, elevators and/or rudders.

Aircraft rudders are typically thin, vertical airfoil structures located, for example, at the aft end of an aircraft's fuselage, that are actuated by a pair of pilot-operated pedals located in the cockpit of the aircraft and used primarily to control yaw of the aircraft during flight. Some embodiments can incorporate a pivotable fin disposed at the rear edge of an otherwise fixed "vertical stabilizer" to effect such control, and in other embodiments, viz., so-called "all flying" embodiments, the entire vertical stabilizer can pivot relative to the fuselage to effect such control. In either case, it is sometimes desirable for the foregoing reasons to prevent movement of the rudder, while maintenance or repair work is being conducted on the aircraft's empennage or associated control systems.

SUMMARY

In accordance with the present disclosure, embodiments of aircraft rudder pedal LOTO assemblies are provided, together with methods for making and using the LOTO assemblies.

In one example embodiment, a lockout assembly for first and second rudder pedals of an aircraft comprises first and second spacers, each of which is configured to be inserted within a corresponding one of first and second slots disposed in an adjacent rudder pedal housing, and a coupling mechanism configured to couple the first spacer to the second spacer through the rudder pedal housing so as to retain the first and second spacers in the corresponding slots.

In another example embodiment, a method for locking out first and second rudder pedals of an aircraft comprises inserting respective ones of first and second spacers within corresponding ones of first and second slots disposed in an adjacent rudder pedal housing and coupling the first spacer to the second spacer through the rudder pedal housing so as to retain the first and second spacers in the corresponding slots.

In yet another example embodiment, an aircraft comprises a rudder, first and second rudder pedals configured to actuate the rudder, and a lockout mechanism disposed between the rudder pedals and a structure located in front of the rudder pedals and configured to prevent movement of both rudder pedals in a rearward direction.

The scope of the invention is defined by the claims, which are incorporated into this section by reference. A better understanding of the rudder pedal lockout devices of the present disclosure, as well as an appreciation of the above and other advantages thereof, will be afforded to those of skill in the art by a consideration of the following detailed description of one or more example embodiments thereof. In this description, reference is made to the various views of the appended sheets of drawings, which are briefly described below, and within which like reference numerals are used to identify like elements illustrated therein.

BRIEF DESCRIPTION OF THE DRAWINGS

FIG. 6 is a rear and right side perspective view of the example rudder pedal lockout assembly in accordance with an embodiment.

DETAILED DESCRIPTION

In accordance with the present disclosure, embodiments of novel aircraft rudder pedal LOTO assemblies are provided, together with methods for making and using them, that are safe, reliable, inexpensive, and easy to use. The lockout assemblies function to prevent movement of the aircraft's rudder pedals, and hence, movement of the aircraft's rudder(s). The embodiments described herein can provide for safe, reliable, inexpensive, and easy-to-use LOTO devices and methods for preventing actuation of an aircraft's rudder pedals, and hence, the aircraft's rudder(s), during, e.g., maintenance and/or repair activities on the aircraft.

Figure 1A:
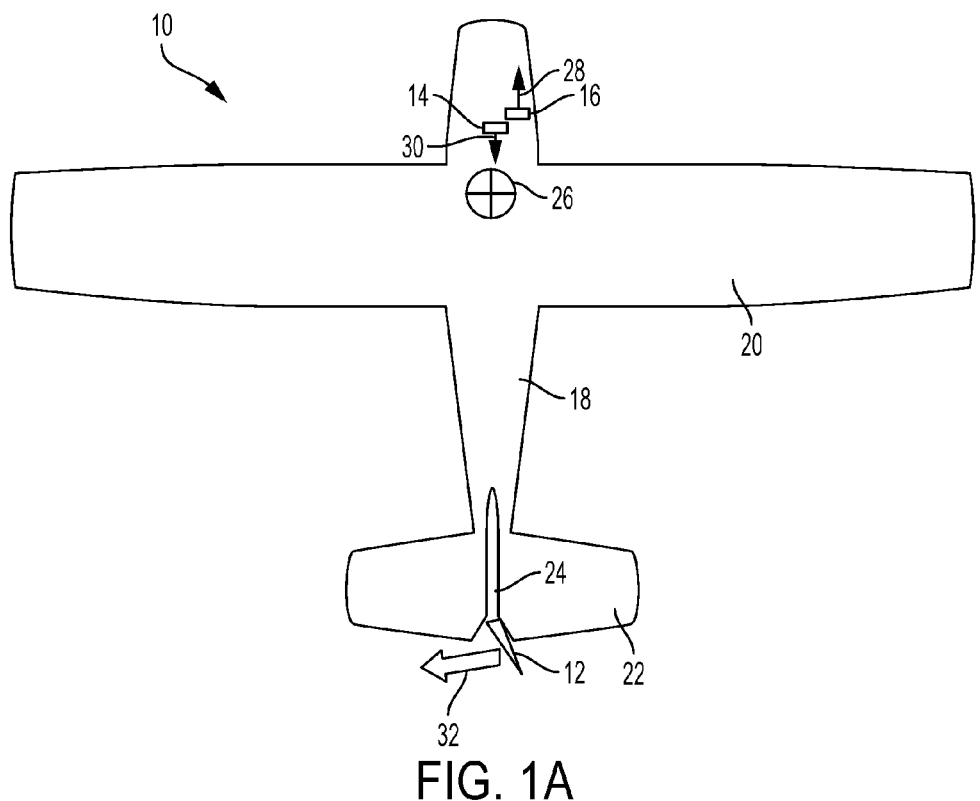
FIGS. 1A and 1B are schematic top plan views of an example aircraft having a rudder actuated by associated first and second rudder pedals, showing a right-rudder actuation by the rudder pedals and a left-rudder actuation by the rudder pedals, respectively.
Figure 1B:
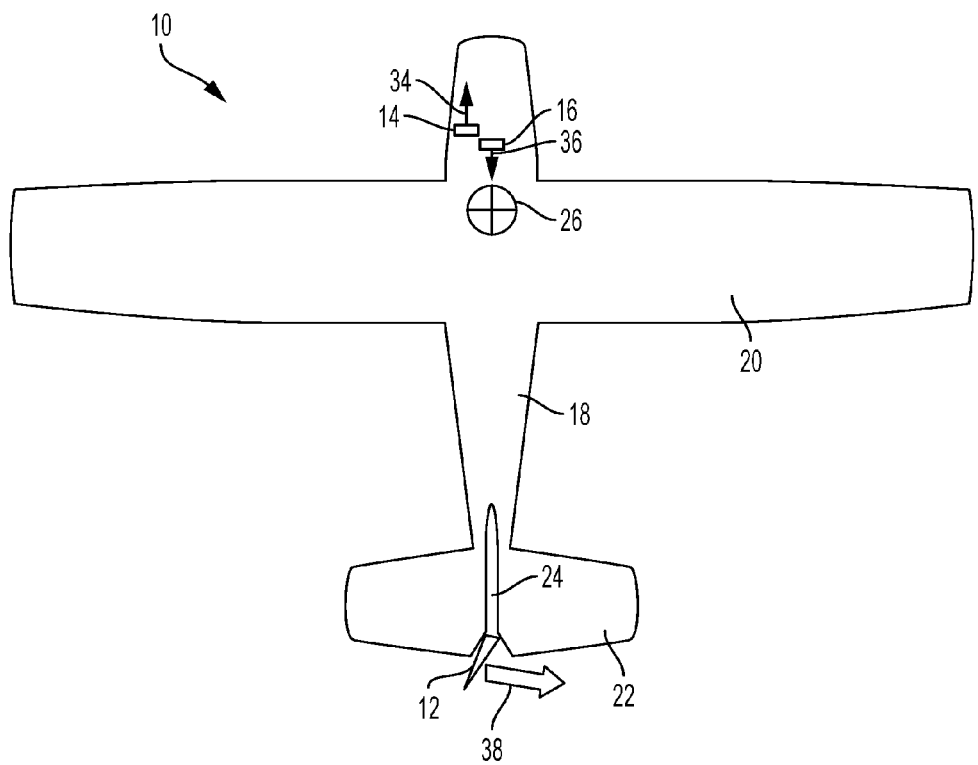

FIGS. 1A and 1B are schematic top plan views of an example aircraft 10 having a rudder 12 actuated by associated a left or first rudder pedal 14 and a right or second rudder pedal 16, showing a "right-rudder actuation" by the rudder pedals 14 and 16, and a "left-rudder actuation" by the rudder pedals 14 and 16, respectively.

As can be seen in FIGS. 1A and 1B, the example aircraft 10 can comprise a fuselage 18 having a pair of wings 20 extending laterally from the fuselage, and an empennage comprising a pair of laterally extending horizontal stabilizers/elevators 22 and a vertical stabilizer 24 having the rudder 12 pivotably attached to a trailing edge thereof. The rudder 12 can be fixed to the vertical stabilizer 24 and the entire vertical stabilizer 24 can pivot relative to the fuselage 18 to effect rudder control, that is, to control yawing movement of the aircraft 10 about the center of gravity (CG) 26 of the aircraft 10 during flight. Some aircraft 10 can incorporate multiple rudders that are simultaneously actuated by an associated pair of rudder pedals. Additionally, in some models of aircraft 10, the rudder pedals 14 and 16 can also be used to actuate landing gear brakes of the aircraft 10 and/or to steer a nose gear or a tail wheel of the aircraft 10 during aircraft taxiing.

The rudder pedals 14 and 16 are coupled to each other through various linkages for conjoint movement, but in opposite directions. Thus, as illustrated in FIG. 1A, if the right, e.g., a second, rudder pedal 16 is pushed forward a selected distance, i.e., in the direction indicated by the arrow 28 (which can be effected with the pilot's right leg and foot), the left (e.g., a first) rudder pedal 14 is moved rearward a corresponding distance in the direction indicated by the arrow 30. This causes the rudder 12 to pivot to the right, as illustrated in FIG. 1A. Conversely, as illustrated in FIG. 1B, if the first rudder pedal 14 is pushed forward a selected distance in the direction indicated by the arrow 34, (which can effected by the pilot with his or her left leg and foot), the second rudder pedal 16 is moved rearward a corresponding distance in the direction indicated by the arrow 36. This causes the rudder 12 to pivot to the left, as illustrated in FIG. 1B.

Thus, it may be seen from the foregoing that, by selectively immobilizing, or "locking out," one, the other, or both of the associated rudder pedals 14 and 16 of the aircraft 10, the rudder 12 of the aircraft 10 can likewise be effectively immobilized or "locked out." Further, because of the interconnected operation of the two rudder pedals 14 and 16 described above, the rudder 12 can be safely locked out in at least two ways. A first way is by locking out movement of one of the rudder pedals 14 or 16 in both directions, i.e., forwardly and rearwardly. A second way is by locking out movement of both of the rudder pedals 14 and 16 in one direction, i.e., forwardly or rearwardly. As discussed in more detail below, the latter method, that is, locking out movement of both rudder pedals 14 and 16 110 in one direction (e.g., rearwardly) can be effected by a rudder pedal lockout assembly that may be safe, reliable, inexpensive, and easy to make and use.

Figure 2:
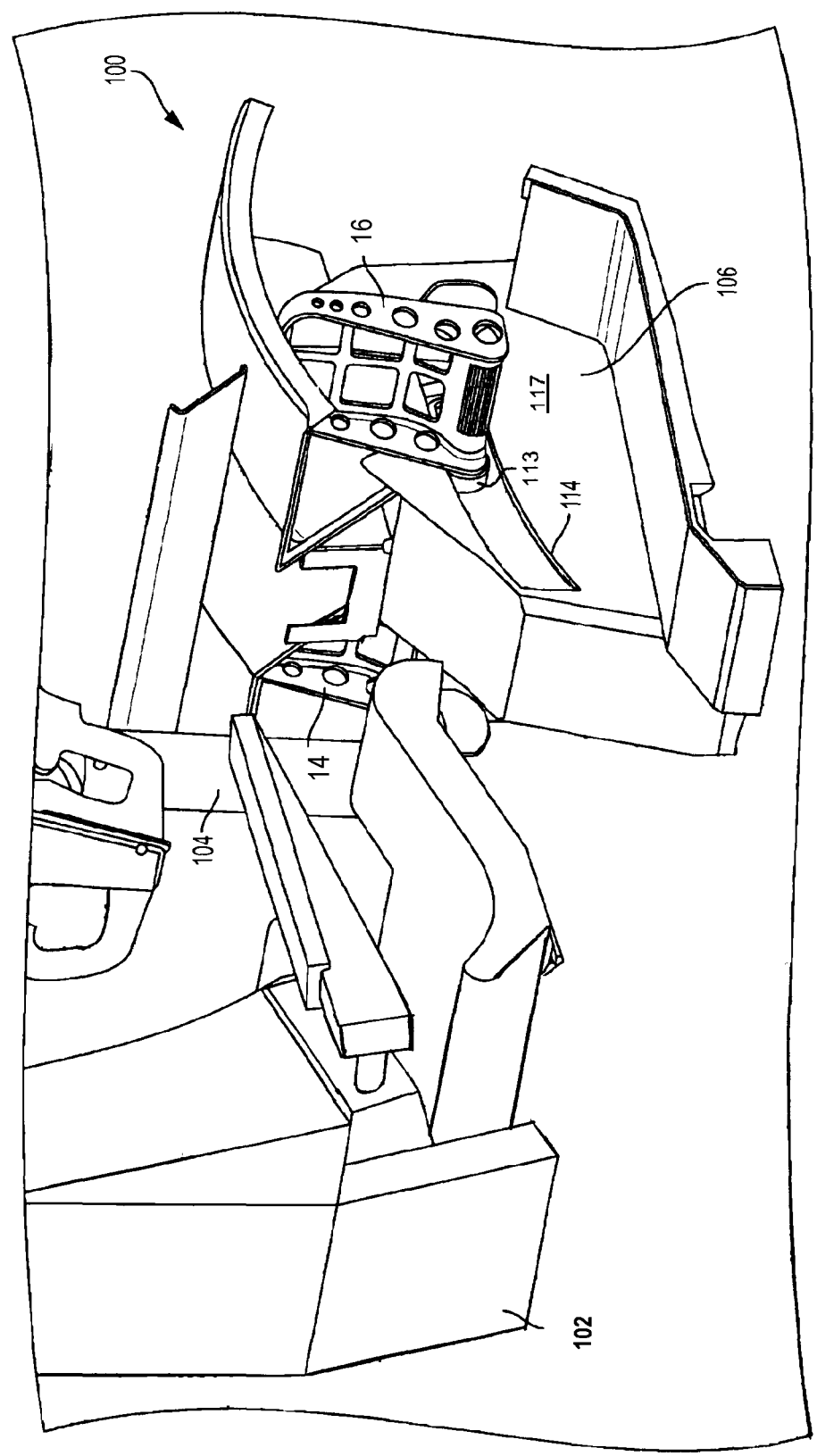
FIG. 2 is a partial rear and right side perspective view of an example pilot's station in an aircraft, showing a pilot's chair, a control yoke, a rudder pedal housing, and first and second rudder pedals located at that station.

FIG. 2 is a partial perspective view of an example embodiment of a pilot's station 100, i.e., that of either a pilot-in-command (PIC) or a co-pilot, of a typical large aircraft, showing various structures and components associated therewith, including a pilot's chair 102, a control column or yoke 104, used to control roll and pitch of the aircraft, a rudder pedal housing 106 disposed forward of and centered with the pilot's chair 102, and first and second rudder pedals 14 and 16 disposed on opposite sides of the rudder pedal housing 106 and used, as described above, to control yaw of the aircraft.

In operation, the pilot (not illustrated) sits with his or her legs straddling the rudder pedal housing 106, and with his or her left leg and right leg respectively disposed in pushing engagement with a corresponding one of the first and second rudder pedals 14 and 16, as described above. As can be seen in, e.g., FIGS. 3A and 3B, the first rudder pedal 14 includes a portion 109 that extends through a first slot 112 defined in a first side wall 111 of the rudder pedal housing 106. Similarly, the second rudder pedal 16 includes a portion 113 that extends through a second slot 115 defined in a second side wall 117 of the rudder pedal housing 106. The portion 109 of the first rudder pedal 14 is coupled to a first rudder actuator linkage or rod 116. Similarly, the portion 113 of the second rudder pedal 16 is coupled to a second rudder actuator linkage or rod 118.

Figure 3A:
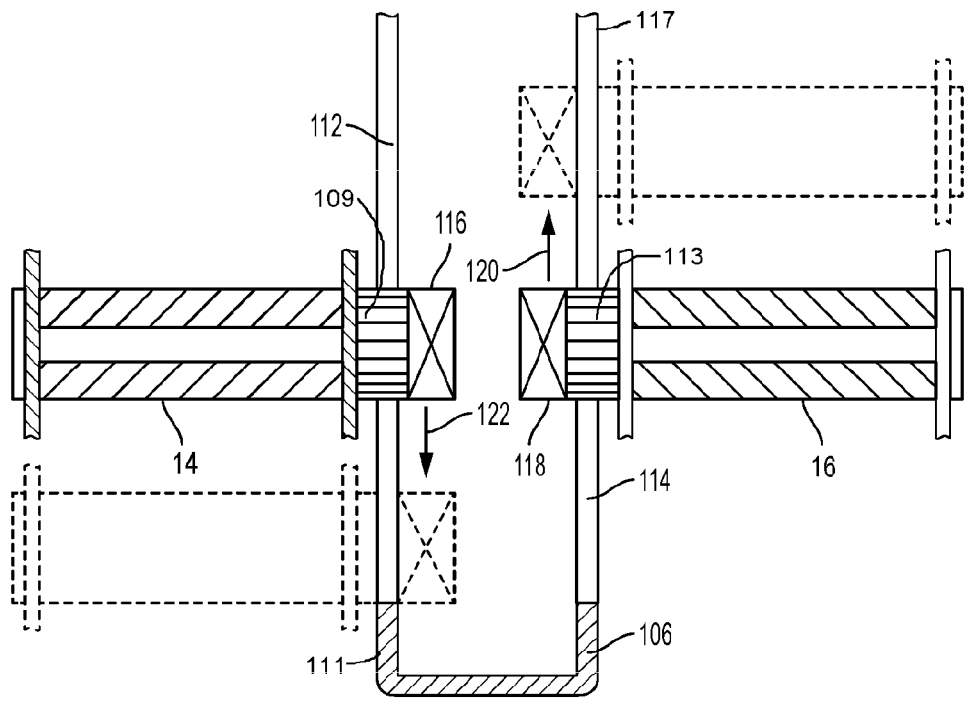
FIGS. 3A and 3B are partial cross-sectional views of the rudder pedals and rudder pedal housing of FIG. 2, as revealed by a transverse cutting plane extending through them, showing actuation of the rudder pedals from a centered position to a full-right-rudder position, and from the centered position to a full-left-rudder position, respectively.
Figure 3B:
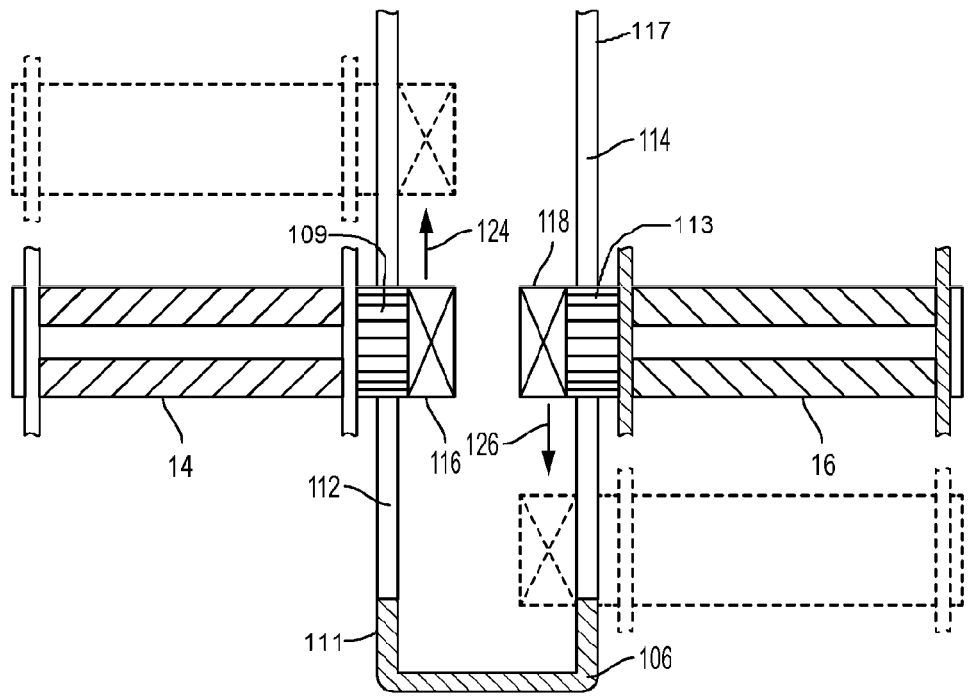

FIGS. 3A and 3B are partial cross-sectional views of the rudder pedals 14 and 16 and the rudder pedal housing 106, as revealed by a transverse cutting plane extending through them, showing right and left actuation of the first and second rudder pedals 14 and 16, in a manner similar to that discussed above in connection with FIGS. 1A and 1B. Thus, in FIG. 3A, movement of the second rudder pedal 16 forward in the corresponding slot 114 in the rudder pedal housing 106, i.e., in the direction of the arrow 120, from a rudder-centered position (illustrated by the solid lines), to a full-right-rudder position (illustrated by the dashed lines), results in a corresponding forward movement of the second rudder actuation rod 118. As discussed above, forward movement of the second rudder actuation rod 118 results in a corresponding rearward movement of the first rudder actuator rod 116, i.e., in the direction of the arrow 122, and hence, a corresponding rearward movement of the first rudder pedal 14.

Conversely, as illustrated in FIG. 3B, movement of the first rudder pedal 14 forward in the corresponding slot 112 in the rudder pedal housing 106, i.e., in the direction of the arrow 124, from a rudder-centered position (illustrated by the solid lines) to a full-left-rudder position (illustrated by the dashed lines), results in a corresponding forward movement of the first rudder actuation rod 116. As discussed above, forward movement of the first rudder actuation rod 116 results in a corresponding rearward movement of the second rudder actuator rod 118, i.e., in the direction of the arrow 126, and hence, a corresponding rearward movement of the second rudder pedal 16.

As discussed above, one method for locking out movement of the rudder of an aircraft is to out movement of both rudder pedals 14 and 16 in one direction. An example embodiment of a rudder pedal lockout assembly 200 that locks out movement of both rudder pedals 14 and 16 in one direction, i.e., rearwardly, is illustrated in FIGS. 4-6.

Figure 4:
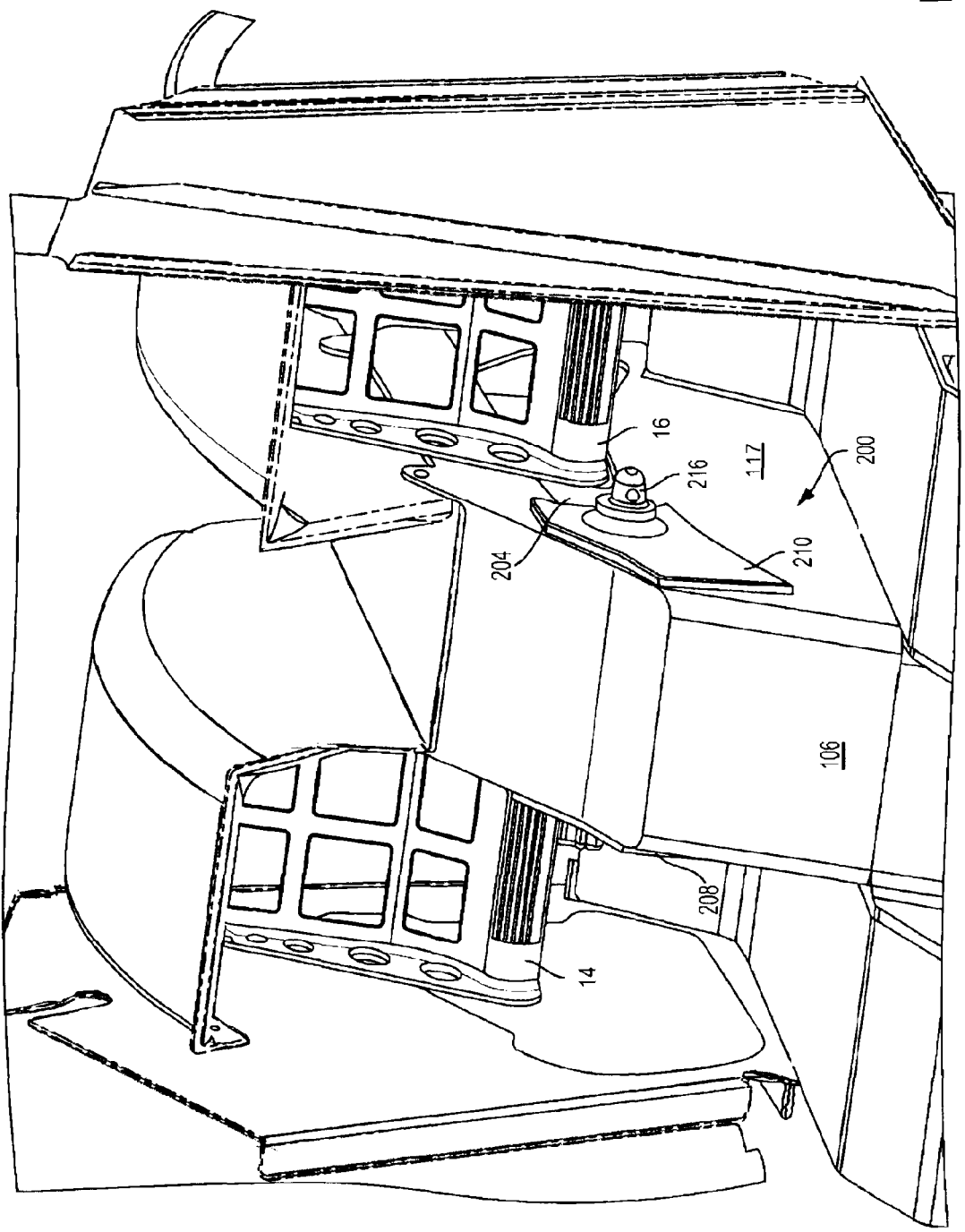
FIG. 4 is a partial rear and right side perspective view of the example pilot's station, showing the rudder pedals, the rudder pedal housing, and an example embodiment of a rudder pedal lockout assembly in accordance with the present disclosure disposed in engagement with the rudder pedals and rudder pedal housing.

FIG. 4 is a partial rear and right side perspective view of the example pilot's station 100, showing the rudder pedals 14 and 16, the rudder pedal housing 106, and the example rudder pedal lockout assembly 200 disposed in lockout engagement with the rudder pedals 14 and 16 and the rudder pedal housing 106 in the manner described below.

Figure 5:
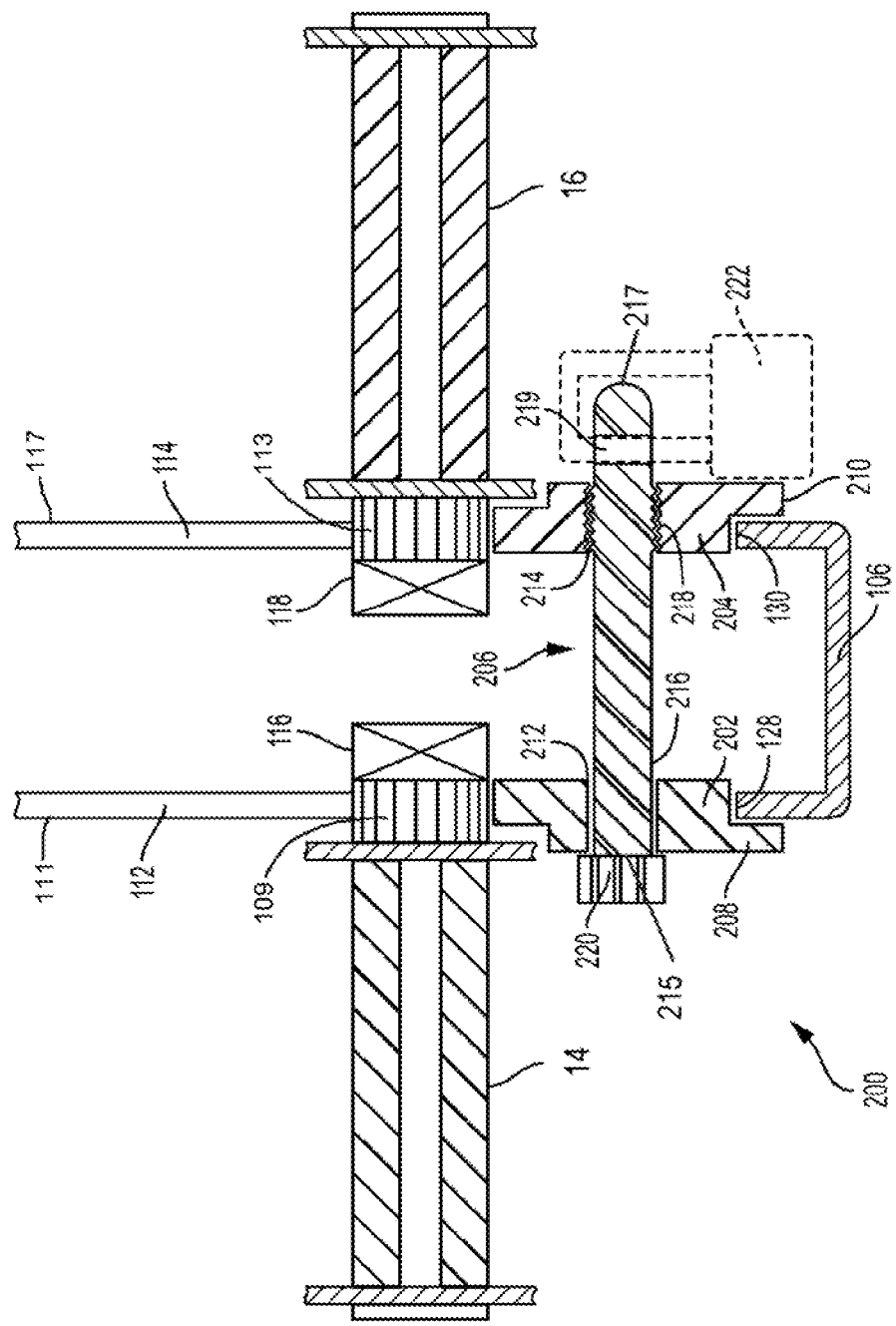
FIG. 5 is a partial cross-sectional view of the rudder pedals, rudder pedal housing and example rudder pedal lockout assembly of FIG. 4, as revealed by a transverse cutting plane extending through the rudder pedals, rudder pedal housing and example rudder pedal lockout assembly, showing an optional locking device arranged to prevent unauthorized removal of the rudder pedal lockout assembly.

FIG. 5 is a partial cross-sectional view of the first and second rudder pedals 14 and 16, rudder pedal housing 106 and the example rudder pedal lockout assembly 200 of FIG. 4, as revealed by a transverse cutting plane extending through them, and FIG. 6 is a rear and right side perspective view of the example rudder pedal lockout assembly 200.

As illustrated in FIG. 5, the rudder pedal lockout assembly 200 includes first and second spacers 202 and 204, each of which is configured to be inserted within a corresponding slot of the first and second slots 112 and 114 disposed in the adjacent rudder pedal housing 106. The lockout assembly 200 also includes a coupling mechanism 206 configured to couple the first spacer 202 to the second spacer 204 through the rudder pedal housing 106 so as to retain the first and second spacers 202 and 204 within corresponding slots of the first and second slots 112 and 114.

As illustrated in FIGS. 3A and 3B, the first rudder pedal 14 includes a portion 109 that extends through the first slot 112 in the side wall 111 of the rudder pedal housing 106, and the second rudder pedal 16 includes a portion 113 that extends through the second slot 114 in the side wall 117 of the rudder pedal housing 106. Each portion 109 and 113 is coupled to a corresponding rod of the first and second rudder actuator rods 116 and 118. As illustrated in FIG. 6, the first spacer 202 is disposed between the rudder pedal portion 109 and a rear end 128 of the first slot 112, and the second spacer 204 is disposed between the rudder pedal portion 113 and a rear end 130 of the second slot 114.

As illustrated in FIGS. 5 and 6, each of the spacers 202 and 204 includes a flange 208 or 210 that is disposed on a lateral surface of the respective spacer 202 or 204 and outboard of the rudder pedal housing 106. Each flange 208 or 210 is configured to position the respective spacer 202 or 204 within the respective slot 112 or 114 and to prevent lateral movement of the respective spacer 202 or 204 from the respective slot 112 or 114 and into the rudder pedal housing 106.

As further illustrated in FIG. 5, each of the spacers 202 and 204 include a corresponding one of a pair of coaxially aligned apertures 212 and 214, and the coupling mechanism 206 includes an elongated rod 216 that is configured to extend laterally through the left and right slots 112 and 114 of the rudder pedal housing 106 and the pair of coaxially aligned apertures 212 and 214 in the spacers 202 and 204. In one embodiment, the rod 216 can include a first end 215, an opposite second end 217, a wrenching feature 218 disposed at the first end 215, and a transverse through-opening 219 disposed adjacent to the second end 217. The wrenching feature 218 can include complementary helical threads respectively disposed on a surface of the rod 216 and in the aperture 214 of the corresponding spacer 204. The wrenching feature 218 can further include a knob 220 disposed at the second end 217 of the rod 216. The knob 220 is configured to be turned by a user to clamp the lockout assembly 200 in place on the rudder pedal housing 106.

As further illustrated in FIG. 5, the transverse through-opening 219 can be configured to receive a shackle of an optional lock 222 (shown in dashed outline), e.g., a keyed padlock or a combination lock, to prevent unauthorized removal of the rudder pedal lockout assembly 200. Alternatively or in addition to the lock 222, a tag or other indicia can be affixed to the rod 216 through the transverse through-opening 219.

As illustrated in FIG. 6, the first spacer 202 and the second spacer 204 can, but need not necessarily, be bilaterally symmetrical with respect to each other about a vertical plane passing between the rudder pedals 14 and 16, and can be fabricated, for example, of a metal by, e.g., a machining or a die casting operation.

Use of the rudder pedal lockout assembly 200 is relatively simple and straightforward. In one example embodiment, the rudder pedals 14 and 112 are initially placed in the rudder-centered position, as discussed above in connection with in FIGS. 3A and 3B. A respective spacer of the first and second spacers 202 and 204 is then inserted within a corresponding slot of the first and second slots 112 and 114 such that each spacer 202 and 204 is disposed between a corresponding rudder pedal 14 or 16 and the rear end 128 or 130 of the corresponding slot 14 or 16.

The first and second spacers 202 and 204 are then coupled to each other through the rudder pedal housing 106 so as to retain the first and second spacers 202 and 204 in a respective slot 112 and 114. Advantageously, the coupling step can include a tightening or pulling of the respective outboard flanges 208 and 210 of the first and second spacers 202 and 204 toward each other and against a corresponding side of the rudder pedal housing 106.

To effect this pulling, the elongated rod 216 is inserted laterally through the first and second slots 212 and 214 of the rudder pedal housing 106 and the pair of coaxially aligned apertures 212 and 214 respectively disposed in each of the first and second spacers 202 and 204. The wrenching feature 220 of the rod 216 is then turned so as to engage the helical thread 218 disposed on the surface of the rod 216 with the complementary helical thread disposed in the aperture 214 of the corresponding spacer 204.

The left-to-right orientation of the rudder pedal lockout assembly 200 on the rudder pedal housing 106 is not important, and can be as illustrated in FIG. 6, or can be reversed from that shown.

Indeed, as those of some skill will by now appreciate, and depending on the specific application at hand, many modifications, substitutions and variations can be made in and to the materials, apparatus, configurations and methods of manufacture and use of the rudder pedal lockout assemblies of present disclosure without departing from its spirit and scope. In light of this, the scope of the present invention should not be seen as limited to those of the particular embodiments illustrated and described herein, as they are merely by way of some examples thereof, but rather, should be fully commensurate with that of the claims appended hereafter and their functional equivalents.

What is claimed is:

1. A lockout assembly for first and second rudder pedals of an aircraft, the first and second rudder pedals being positioned with respect to a rudder pedal housing, wherein the rudder pedal housing has first and second slots, the lockout assembly comprising:
    first and second spacers, the first spacer being configured to be inserted within the first slot in the rudder pedal housing and the second spacer being configured to be inserted within the second slot in the rudder pedal housing; and
    a coupling mechanism configured to couple the first spacer to the second spacer through the rudder pedal housing so as to retain the first spacer in the first slot and the second spacer in the second slot.

2. The lockout assembly of claim 1, wherein:
    each of the first and second slots has a rear end;
    a corresponding portion of each of the first and second rudder pedals is configured to travel within a corresponding slot; and
    each of the first and second spacers is disposed between a corresponding portion and the rear end of the corresponding slot.

3. The lockout assembly of claim 1, wherein each of the first and second spacers comprises a flange that is disposed on a lateral surface of the respective spacer and outboard of the rudder pedal housing, each flange being configured to position the respective spacer within the corresponding slot and to prevent lateral movement of the respective spacer from the corresponding slot and into the rudder pedal housing.

4. The lockout assembly of claim 1, wherein each of the spacers comprises an aperture of a pair of coaxially aligned apertures and the coupling mechanism comprises an elongated rod configured to extend laterally through the slots of the rudder pedal housing and the pair of coaxially aligned apertures respectively disposed in each of the spacers.

5. The lockout assembly of claim 4, wherein the rod includes a first end and an opposite second end, and the rod further comprises a wrenching feature disposed at the first end of the rod and a transverse through-opening disposed adjacent to the second end of the rod.

6. The lockout assembly of claim 5, wherein the wrenching feature comprises complementary helical threads respectively disposed on a surface of the rod and in the aperture of the corresponding spacer.

7. The lockout assembly of claim 5, wherein the wrenching feature comprises a knob configured to be turned by a user.

8. The lockout assembly of claim 5, wherein the transverse through-opening is configured to receive a shackle of a lock.

9. The lockout assembly of claim 1, wherein the first spacer and the second spacer are bilaterally symmetrical with respect to each other about a vertical plane passing between the first and second rudder pedals.

10. A method for locking out first and second rudder pedals of an aircraft, the method comprising utilizing the lockout assembly of claim 1 by installing the lockout assembly into the first and second slots of the rudder pedal housing.

11. A method for locking out first and second rudder pedals of an aircraft, the method comprising:
inserting a first spacer within a first slot disposed in a rudder pedal housing;
inserting a second spacer within a second slot disposed in the rudder pedal housing; and
coupling the first spacer to the second spacer through the rudder pedal housing so as to retain the first spacer in the first slot and the second spacer in the second slot.

12. The method of claim 11, wherein
each slot has a rear end; and
the coupling comprises releasably coupling the first and second spacers in the first and second slots such that each spacer is disposed between a corresponding rudder pedal and the rear end of the corresponding slots.

13. The method of claim 12, wherein
each of the first and second spacers includes a flange disposed on a lateral surface of the respective spacer and outboard of the rudder pedal housing, the method further comprising:
positioning the flange with respect to the rudder pedal housing such that the respective spacer is within the corresponding slots to prevent lateral movement of the spacer from the slot and into the rudder pedal housing; and
the coupling comprises pulling the flanges toward each other and against opposite sides of the rudder pedal housing.

14. The method of claim 13, wherein the pulling comprises:
inserting an elongated rod laterally through the slots of the rudder pedal housing and a pair of coaxially aligned apertures respectively disposed in each of the first and second spacers, the rod having opposite first and second ends, a wrenching feature disposed at the first end, and a transverse through-opening disposed adjacent to the second end; and
turning the wrenching feature of the rod so as to engage a helical thread disposed on a surface of the rod with a complementary helical thread disposed in the aperture of a corresponding one of the spacers.

15. The method of claim 14, further comprising:
inserting a shackle of a lock through the transverse through-opening; and
lockingly engaging the shackle in a body of the lock.

16. The method of claim 14, further comprising affixing a tag to the rod through the transverse through-opening.

* * * * *